United States Patent [19]

George et al.

[11] Patent Number: 5,507,847
[45] Date of Patent: Apr. 16, 1996

[54] ULPA FILTER

[75] Inventors: Nelson A. George, North East, Md.; Michael G. Sutsko, Glen Mills, Pa.; Douglas B. McKenna, Dover, Del.

[73] Assignee: W. L. Gore & Associates, Inc., Newark, Del.

[21] Appl. No.: 284,314

[22] Filed: Jul. 29, 1994

[51] Int. Cl.$^6$ .................................................. B01D 46/00
[52] U.S. Cl. .............................. 55/486; 55/497; 55/500; 55/502; 55/522
[58] Field of Search .............................. 55/485, 486, 487, 55/497, 500, 502, 511, 521, 522

[56] References Cited

U.S. PATENT DOCUMENTS

| | | | |
|---|---|---|---|
| 3,455,459 | 7/1969 | Troy | 55/522 |
| 3,697,377 | 10/1972 | Gauthron | 55/522 |
| 3,953,566 | 4/1976 | Gore | 264/505 |
| 4,286,977 | 9/1981 | Klein | 55/524 |
| 4,687,579 | 8/1987 | Bergmann | 210/347 |
| 4,824,451 | 4/1989 | Vogt et al. | 55/528 |
| 4,877,433 | 10/1989 | Oshitari | 55/486 |
| 4,932,078 | 6/1990 | Jones et al. | 2/70 |
| 4,941,900 | 7/1990 | Cordes | 55/319 |
| 4,963,170 | 10/1990 | Weber et al. | 55/311 |
| 5,019,140 | 5/1991 | Bowser et al. | 55/485 |
| 5,058,491 | 10/1991 | Wiemer et al. | 98/115.3 |
| 5,096,473 | 3/1992 | Sassa et al. | 55/486 |
| 5,108,474 | 4/1992 | Riedy et al. | 55/485 |
| 5,114,447 | 5/1992 | Davis | 55/485 |
| 5,127,927 | 7/1992 | Holmes et al. | 55/313 |
| 5,158,586 | 10/1992 | Layton | 55/497 |
| 5,238,477 | 8/1993 | Layton | 55/497 |
| 5,240,479 | 8/1993 | Bachinski | 55/103 |

FOREIGN PATENT DOCUMENTS

| | | |
|---|---|---|
| 0246917 | 11/1987 | European Pat. Off. . |
| 0525630 | 2/1993 | European Pat. Off. . |
| 2082642 | 8/1980 | United Kingdom . |
| 2264072 | 8/1993 | United Kingdom . |
| 9108829 | 6/1991 | WIPO . |

OTHER PUBLICATIONS

"Porous Teflon and Kel-F-Chemically Inert Filter Media", Pall Trinity Micro Corp., ©1964.

Domnick Hunter Engineers, Ltd. Brochure from Filtration & Separation, vol. 10, No. 3, Jun. 1973.

"Cleanroom Basics: A Guide for the Perplexed"; Richard A. Matthews; *Medical Device & Diagnostic Industry*; pp. 57–62; Feb. 1994.

"Laminar Flow Grade—Filters For Cleanroom Applications"; Flanders; Bulletin No. 384D; 1991.

Article: "Designing and Constructing The Next Generation of HEPA Filters"; Virender K. Bhola, Intel; pp. 31–35; *Microcontamination* Dec. 1993.

*Primary Examiner*—C. Scott Bushey
*Attorney, Agent, or Firm*—David J. Johns

[57] ABSTRACT

An improved filter unit suitable for use in a variety of clean air filtration applications is taught. The filter unit employs continuous microporous filtration membranes, such as expanded polytetrafluoroethylene, to deliver exceptional filtration efficiencies on the order of 99.99999% at 0.1 μm with minimal pressure drop produced across the filter. Additionally, the filter unit of the present invention has the further advantage of avoiding many previous deficiencies in HEPA and ULPA filter units, such as filter contamination from shedding particles and/or out-gassing, and limitations on chemicals to which the filter can be exposed without deterioration. As a result, the present invention provides a cleaner and more durable filter that can be used to address growing contamination problems in many different industries, such as electronics and pharmaceuticals.

20 Claims, 2 Drawing Sheets

ULPA FILTER

BACKGROUND OF THE INVENTION

1. Field of the Invention

The present invention relates to filter apparatus for use in clean rooms, mini-environments, and similar facilities, and particularly ultra-clean filters for use in such facilities.

2. Description of Related Art

Filtration efficiencies and contamination control are growing areas of concern in many industries requiring clean and ultra-clean facilities, such as in pharmaceutical and semiconductor manufacture. As tolerances for contamination have become stricter, a variety of improved air conditioning and air filtering products have been developed.

One of the areas of most active interest has been in the development of improved air filters capable of removing sub-micron particulates and other contaminates from the air. High Efficiency Particulate Air (HEPA) filters generally have a minimum efficiency of about 99.97% at 0.3 µm. In more sensitive environments, Ultra-Low Penetration Air (ULPA) filters can be used having a filtration efficiency in excess of 99.999% at 0.1 µm.

One form of HEPA filter is disclosed in U.S. Pat. Nos. 5,158,586 and 5,238,477 both issued to Layton. This filter comprises a membrane formed from either a continuous sheet of porous metal (e.g., stainless steel, titanium, aluminum) having interstices defining minute pores admitting gas but rejecting particles borne by the gas, or a tightly woven sheet of fine wires. Although filter efficiency is not discussed in these patents, it is taught that a steel sheet generally has a thickness of about 0.01 inches and pores of about 0.5 µm.

A number of HEPA and ULPA filters are available commercially, such as from Flanders Filters, Inc., Marietta, NC, American Air Filter Co., Louisville, Ky., Filtra Corp., Hawthorne, N.J., and Donaldson Co., Inc., Minneapolis, Minn. Typically these filters are composed of a fibrous filter media (e.g., fiberglass fibers bound by an acrylic resin) oriented into a pleated construction within a frame. While these filters work well for many applications, they suffer from a number of deficiencies.

First, a concern has been raised that fibrous filter media may be prone to shedding minute fibers under certain conditions. This may not be a concern in most applications, but can become a major contamination issue where extremely low particle counts are required.

Second, many existing filter units are susceptible to chemical attack under certain conditions. For example, hydrofluoric acid used in semiconductor wet process applications can be particularly aggressive to common air filtration media. In those instances where air is recirculated in a clean environment employing such chemicals, many filter products will prematurely breakdown and begin shedding contaminating particles.

Third, many existing filter media are prone to attack by mere moisture in the air system. For example, fiberglass material may experience clogging and breakdown with high levels of moisture or during prolonged liquid exposure.

Fourth, another filter contamination problem is that some filter products "out-gas" during use. This outgassing commonly occurs from various potting materials used to hold the filter media in a frame (e.g., polyurethane) as well as from the filtration media and/or chemical treatments of the filtration media (e.g., fire retardant treatment). Again, in particularly sensitive environments, even small amounts of chemical release from the filtration apparatus itself can be detrimental. Examples of such compounds include boron and phosphorous.

Fifth, it has been shown that operating air systems at greater than 100 ft/min can cause vibration in the filter media. With fibrous filter media, such as fiberglass, this vibration can result in shedding of particles and contamination. Additionally, due to volumetric flow requirements, in order to achieve 90–100 ft/min flow downstream from the filter, a flow rate of 110–120 ft/min or more may be required at the filter face.

U.S. Pat. No. 5,114,447 issued to Davis discloses an ultra-high efficiency porous metal filter with filtration efficiency up to 99.9999999% for use in an in-line supply system for process gas. While this patent demonstrates that extremely high filtration efficiencies are possible, the construction employed to achieve this level of cleanliness is completely inappropriate for use in filtering a large volume of air over a wide surface area in the manner normally used in a room or mini-environment filtration system. Additionally, although the pressure drop caused by such a filter may be only of minimal concern in a high pressure gas line, it is believed to be intolerable for air conditioning/filtration applications.

Accordingly, it is a primary purpose of the present invention to produce an air filter for use in air supply systems for clean environments that are extremely clean while maintaining acceptable pressure drop across the filter media.

It is a further purpose of the present invention to produce an air filter for use in air supply systems for clean environments that does not contribute its own contamination during use, such as by shedding particles or through out-gassing.

It is another purpose of the present invention to produce an air filter for use in air supply systems for clean environments that is chemically inert, allowing it to be used in the presence of a wide variety of chemicals without incurring filter media breakdown or damage.

It is still another purpose of the present invention to produce an air filter for use in air supply systems for clean environments that is resist to damage from water or moisture.

These and other purposes of the present invention will become evident from review of the following specification.

SUMMARY OF THE INVENTION

The present invention is an improved filter suitable for use in a wide variety of air and gas filtration applications. The filter of the present invention is particularly suitable for use as an ULPA filter for use in clean facilities, such as in manufacturing clean rooms, mini-environments, and similar applications.

The filter unit of the present invention employs a filtration media comprising at least one microporous filtration layer, preferably an expanded polytetrafluoroethylene (PTFE) membrane, sandwiched between one or more layers of an upstream and a downstream support material. The filtration media may be pleated and mounted in a frame for easy installation in an air conduit.

The filter of the present invention is a significant improvement over previous HEPA and ULPA filters. First, the filter itself is not prone to contributing contamination to the air stream. Unlike fiberglass and similar fibrous filters, the filter of the present invention employs only continuous materials (e.g., expanded PTFE membranes for filtration and NAL- TEX brand scrim for support) on the downstream side that are not prone to shedding fibers or other particles during use. Further, the continuous material of the present invention is less prone to damage than fiberglass and similar media. As a result, less care is required during handling and protective covers may not even be required.

Second, by using chemically inert materials, such as PTFE, the filter unit can be used in a wide variety of possibly harsh applications without sacrificing filter integrity. Similarly, the filter of the present invention is extremely hydrophobic, allowing the surface to be exposed to relatively large amounts of water or humidity without absorbing the moisture and without risking clogging or breaking down of the filter media.

Third, the filter unit of the present invention is constructed from materials that are stable and that do not contribute out-gas contamination.

Finally, the filter of the present invention can achieve exceptional filtration efficiencies on the order of 99.99999% or more at 0.1 µm or more, while experiencing a pressure drop of less than 0.7 inches of $H_2O$. This is a significant improvement over presently available filter units that generally have to sacrifice either filtration efficiency or pressure drop in order to function properly.

DESCRIPTION OF THE DRAWINGS

The operation of the present invention should become apparent from the following description when considered in conjunction with the accompanying drawings, in which.

DETAILED DESCRIPTION OF THE INVENTION

The present invention is an improved filter suitable for use in a variety of air filtration facilities, and especially for ultra-clean air conditioning filtration in clean rooms, mini-environments, and similar applications.

Figure 1:
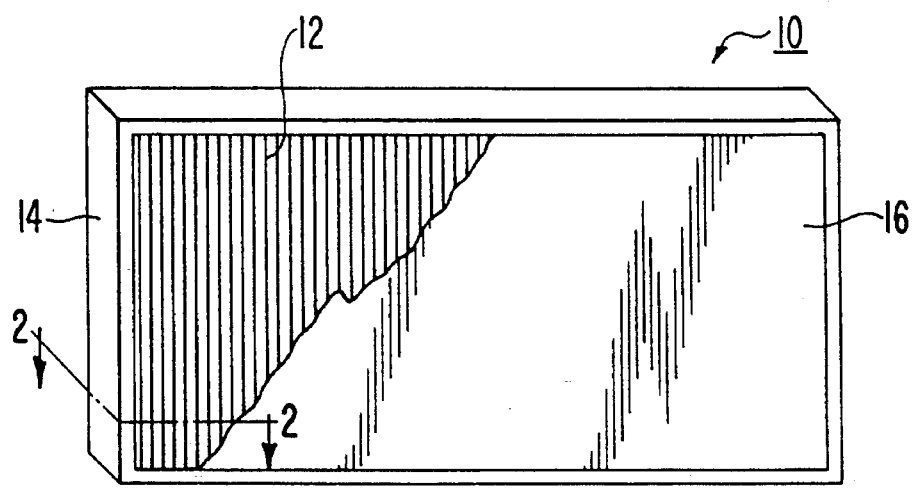
FIG. 1 is a three-quarter isometric view of a filter of the present invention mounted in a frame, with a section of a protective covering shown removed.

Shown in FIG. 1 is a filter 10 of the present invention. The filter 10 comprises a composite filtration media 12 mounted within a frame 14. Optionally, an air permeable protective covering 16 may be installed on one or both sides of the filter unit 10 to provide a flush, cleanable surface. The dimensions of the frame 14 are application specific and should be designed to provide a tight fit within a conduit carrying the air to be filtered.

Figure 2:
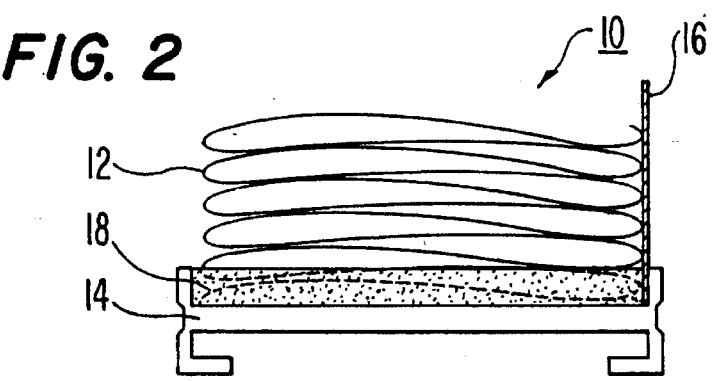
FIG. 2 is a partial cross-sectional view of the filter and frame of the present invention along line 2—2 of FIG. 1.

As may be better seen in FIG. 2, the filtration media 12 is preferably folded upon itself in a pleated fashion so as to provide better structural integrity and to significantly increase the exposed surface area for filtration. The filter media 12 should be mounted into the frame 14 so as to create an air-tight fit between the filtration media 12 and the frame 14 and avoid the seepage of unfiltered air around the filtration media 12.

Ideally, the filtration media 12 is mounted to the frame 14 using a potting material 18, such as polyurethane, epoxy, silicone, hot-melt adhesive, or plastisol. In order to establish a tight seal, the potting material 18 should be chosen or treated to wet-out into the filtration media 12 so as to assure a continuous seal. Materials such as silicone wet-out the membrane reasonably well. Other materials such as polyurethanes require the addition of some surfactant to achieve wetting. A surfactant may also be applied to the media to allow an adhesive to wet-out as well.

The preferred potting material 18 for use with the filter of the present invention comprises one that is chemically resistant, is not prone to release out-gas contamination, and readily absorbs into the filtration media 12. Suitable materials include: polyurethane, epoxy, silicone, hot-melt adhesive, plastisol, etc. A preferred material comprises a fully cross-linked silicone rubber polymer without additives to minimize out-gassing.

Figure 3:
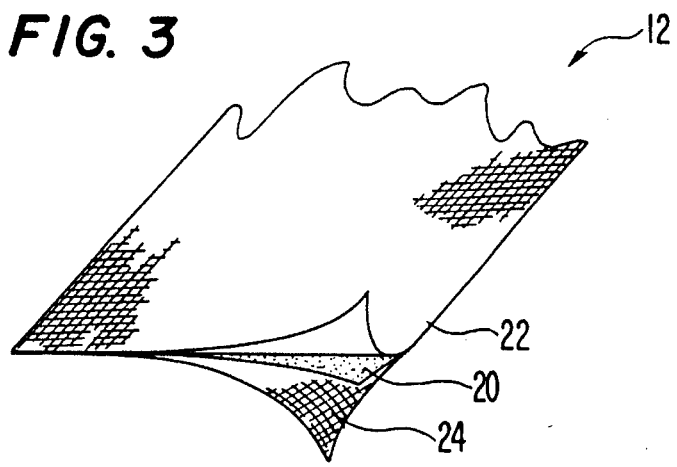
FIG. 3 is a three-quarter elevational view of one embodiment of the filter material of the present invention, with the individual layers shown exposed for detail.

The heart of the present invention is the filtration media 12 itself. As is shown in FIG. 3, in its simplest form the filtration media 12 of the present invention comprise a primary microporous filtration layer 20 sandwiched between an upstream support material 22 and a down stream support material 24. The preferred filtration layer 20 is a microporous fluoropolymer, such as expanded polytetrafluoroethylene (PTFE), fluorinated ethylenepropylene (FEP), perfluoroalkoxy polymer (PFA), polypropylene, polyethylene, and ultra-high molecular weight polyethylene (UHMWPE). For use in clean room facilities rated class 10 or better, the filter made from such material should have the following properties: be non-shedding and non-outgassing; have >99.97% filtration efficiency at 0.3 µm; and have <1.0 inch $H_2O$ pressure drop at 100 ft/min air velocity.

The filtration material of choice comprises one or more layers of expanded PTFE sheet material, such as that made in accordance with U.S. Pat. No. 3,953,566 to Gore, incorporated by reference. Optimally, the filtration material comprises five layers of expanded PTFE membrane, each layer having a resistance of 0.5 inches (12.7 mm) $H_2O$ at an air flow of 60 feet per minute (18.29 m/min). The layers can be stacked to form a single sheet of filtration material. Preferably, the layers are bonded together, such as through coventional heat and pressure lamination techniques so that the layers do not readily come apart. Alternatively, the layers may be simply stacked together and held in place around their edges.

When produced in this manner, a high-strength membrane material will be produced that is capable of retaining its strength and shape without sacrificing air flow or filtration efficiency. For high level of filtration (e.g., 99.99999% at 0.1 µm) with less than 0.7" $H_2O$ pressure drop, this membrane should have approximately 12 ft/min of air flow at 0.5" $H_2O$ pressure drop. For flat sheet samples, the material should have an efficiency of at least 99.97% at 0.3 µm at a 10.5 ft/min flow rate. More preferably, the efficiency is >99.99% at 0.1 µm at 10.5 ft/min. Efficiency was calculated in accordance with Institute of Environmental Sciences (IES) test procedure IES-RP-CC-7.1, which is described in detail below.

Further, the membrane should have an average ball burst test value of greater than or equal to 3.0 lb-force, within a range of less than 1.4 between maximum and minimum values. This was calculated in accordance with ASTM Standard D3787-89 "Burst Strength for Knitted Goods,"

incorporated by reference, with the following modifications: the internal diameter of the measurement chamber was 3" (7.62 cm); and the clamping rate was 10 in/min (25.4 cm/min).

Most preferably, the filtration layer 20 comprises a primary filtration layer and one or more secondary filtration layers of expanded PTFE material mounted parallel to each other (either with direct contact between the primary and secondary filtration layers or with one or more other layers of material mounted there between). By directing the air to be filtered through multiple filtration layers in series, any small leaks that may develop in a single membrane are likely to align with coherent membrane in the next layer, thus avoiding filter compromise. Additionally, multiple filtration layers also supply additional protection surrounding the filtration material.

The support material 22, 24 is provided to retain the filtration layer(s) in proper orientation during use. It is important that the support material establishes and maintains proper filtration layer position without disrupting the flow of air therethrough. Preferred material should be rigid enough to support the membrane, but soft and flexible enough to avoid damage to the membrane. In a pleated orientation, the material should provide airflow channels into the pleats while holding the pleats apart (i.e., preventing the pleats from collapsing). Materials such as NAL-TEX brand scrim available from Nalle Plastics, Austin, Tex., or other similar woven screens should be suitable for these applications.

Figure 4:
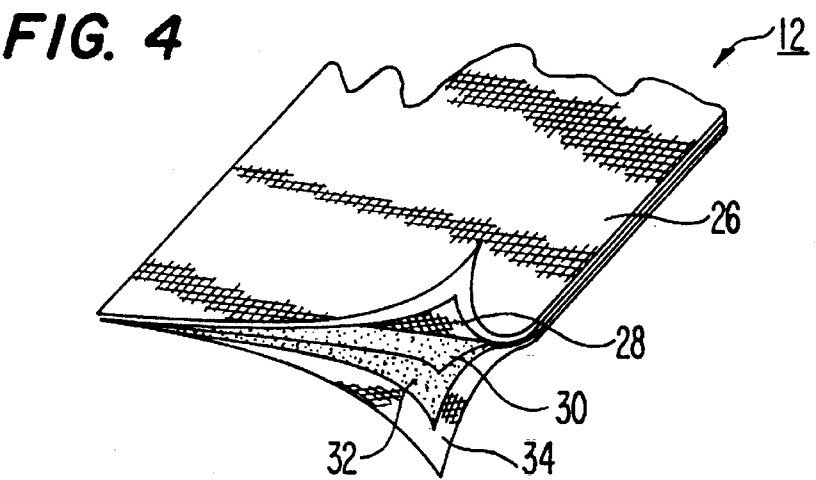
FIG. 4 is a three-quarter elevational view of another embodiment of the filter material of the present invention, with the individual layers shown exposed for detail.

Another embodiment of a filter media 12 of the present invention is shown in FIG. 4. In this embodiment the filter media 12 comprises an upstream support material 26, a second layer of upstream support material 28, two layers of expanded PTFE filtration material 30, 32, and a downstream support material 34. The preferred support material for use in this embodiment comprises a scrim, such as a NAL-TEX brand scrim described above.

The second layer of upstream support material 28 is provided to protect the expanded PTFE membrane from damage by the scrim material. Suitable material for this purpose includes REEMAY 2250 material available from REEMAY, Inc., Old Hickory, Tenn.

While the preferred filtration layers comprise an expanded PTFE material as described above, other filter media that may be suitable for use in the present invention include: fluorinated ethylene propylene (FEP); perfluoroalkoxy polymer (PFA), polypropylene (PP), polyethylene (PE), and ultra-high molecular weight polyethylene (UHMWPE).

One of the chief advantages of the present invention is that the filter itself avoids adding contamination to the air stream, even when used in harsh environments. Unlike commercially available fiberglass and similar fibrous HEPA filters, the filter of the present invention employs only continuous materials on the downstream side that are not prone to shedding fibers or other particles during use. The use of chemically inert materials, such as PTFE, allows the filter unit to be used in a wide variety of possibly harsh applications without sacrificing filter integrity. Further, the filter unit of the present invention is constructed from materials that are stable and which do not contribute out-gas contamination.

Another advantage of the present invention is its ability to provide exception filtration efficiencies (e.g., >99.99999% at 0.1 μm) while maintaining a minimal pressure drop across the filter (e.g., 0.7" $H_2O$).

It is important to note that the preferred method of combining the layers of filter media is to loosely pleat them together, rather than laminating them. This allows the layers to freely pleat (and slightly shift position if necessary) without damaging the membrane. Although it may be possible to laminate the layers together for some applications, this may require separators to hold the pleats apart, which may damage the membrane in the process. Lamination may also restrict air flow.

While the filter of the present invention produces very high filtration efficiencies, on the order of >99.99999% at 0.1 μm, it should be appreciated that the present invention is not limited to such applications. Exceptional benefits may be produced with a filter of the present invention with fewer layers of filtration membranes or through use of membranes with lesser efficiencies, such as use of filters in HEPA applications requiring only 99.97% efficiencies and other applications requiring only 99.99 to 99.999% efficiencies. Also the other properties of the filters of the present invention, such as being non-shedding and non-outgassing, may be very beneficial under certain circumstances.

Without intending to limit the scope of the present invention, the following examples illustrate how the present invention may be made and used:

A ULPA filter was produced using a filtration media comprising two sheets of expanded PTFE, each measuring 60 cm in width by 2000 cm in length. Each of the expanded PTFE sheets comprised five layers of expanded PTFE membrane, each layer having a resistance of 0.5 inches (12.7 mm) $H_2O$ at an air flow of 60 feet per minute (18.29 m/min). The layers were stacked and bonded together to form a single sheet of filtration material. The membrane had: about a 12 ft/min of air flow at 0.5" $H_2O$ pressure drop; an efficiency of >99.99% at 0.1 μm at 10.5 ft/min; and an average ball burst test of less than 3.0.

The filtration media was mounted between two sheets of P/N 4085 NAL-TEX brand natural polypropylene scrim, each measuring 60 cm by 2000 cm and comprising 0.030" (0.762 cm) thick, 25" (63.5 cm) wide, with strands extruded and joined at a 90° angle with 9 strands per inch. The ePTFE/scrim composite was pleated to a depth of 5.08 cm (2 inches) and having 0.79 pleats per cm (8 pleats/inch) and cut to 60 cm by 61 cm in size.

An anodized aluminum frame was constructed measuring 61 cm by 61 cm outside diameter. The frame included a grove around its perimeter, such as that shown in FIG. 2, measuring about 9.76 cm inside dimension wide (i.e., wide enough to allow the pleated composite to be mounted therein). The frame was primed with a Part No. SS 4155 silicone primer, available from GE Silicones, of Waterford, N.Y., to provide better adhesion of the potting to the frame.

The pleated composite was then mounted within the frame and held in place with a potting of silicone (RTV-615 silicone acquired from GE Silicones) placed around the frame at a depth of 1.0–1.5 cm. The frame was then allowed to cure for 5 min. at approximately 150° C. and for 24 hours at ambient conditions.

This filter was then tested in accordance with Institute of Environmental Sciences (IES) test procedure IES-RP-CC-7.1, incorporated by reference. This procedure is described below.

Figure 5:
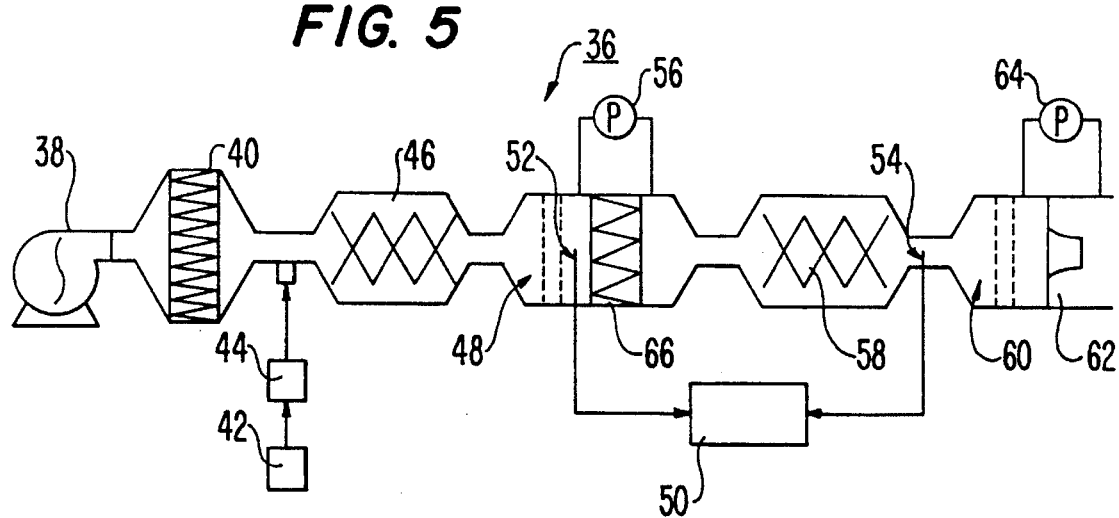
FIG. 5 is a schematic representation of a test rig used to test the filter of the present invention.

As is shown in FIG. 5, a test rig 36 was created comprising: a variable speed blower 38; a prefilter 40; an aerosol generator 42; a charge neutralizer 44; an upstream mixer 46; an upstream airflow diffuser 48; a particle counter 50, measuring samples from an upstream sampling point 52 and a downstream sampling point 54; filter pressure drop measurer 56; a downstream mixer 58; a downstream airflow diffuser 60; an air flow measurement nozzle 62; and an air flow measurement manometer 64. A filter 66 to be tested was then inserted in the chamber indicated.

The air filter 66 was measured in the following manner. First, air flow was measured via a pressure drop across nozzle 62. The air flow as then set at the desired level by adjusting blower 38 to establish a rate of 100 ft/min across the test filter 66. Once set in the manner, most particles were removed from the airstream by prefilter 40. A neutralized aerosol was then injected into the airstream through charge neutralizer 44. In this instance, 105 nm polystyrene latex (PSL) spheres were used as the aerosol.

The airstream was then mixed by upstream mixer 46 and conditioned by diffuser 48. A particle count was taken upstream of the filter 66 at sample point 52 using a PMS LPC-0710 0.07 µm, 1 CFM particle counter, such as Part No. PMS LPC-070 available from Particle Measurement Systems of Boulder, Colo.

After the air stream passed though filter 66, the pressure drop through the filter was measured and calculated using standard magnehelic gauges.

The airstream was then mixed again by downstream mixer 58 and sampled at sample point 54.

The efficiency of the filter was calculated as:

$$\text{Penetration} = \frac{\text{Downstream Counts}}{\text{Downstream Sample Time}} \div \frac{\text{Upstream Counts}}{\text{Upstream Sample Time}}$$

The sample rate was 1 CGM. Efficiency percentage (%) was calculated as Efficiency %=(1−penetration)×100.

First tests were performed on samples of flat membrane from the beginning, middle, and end of various rolls of material. The percentage efficiency of this material is set forth in the following table:

| | ULPA Filter Flat Membrane Testing | | | |
|---|---|---|---|---|
| Sample | Beg-Mid-End | Airflow fpm | Delta P inches H2O | % Efficiency |
| Sample 1 | end | 10.7999 | 0.492125 | 99.99531 |
| Sample 2 | mid | 10.78987 | 0.423621 | 99.98727 |
| Sample 3 | beg | 10.80167 | 0.390944 | 99.95425 |
| Sample 4 | end | 10.4617 | 0.464959 | 99.99783 |
| Sample 5 | mid | 10.44677 | 0.414566 | 99.99688 |
| Sample 6 | beg | 10.45721 | 0.390944 | 99.97042 |
| Sample 7 | end | 10.45655 | 0.505117 | 99.99742 |
| Sample 8 | mid | 10.47451 | 0.412991 | 99.99502 |
| Sample 9 | beg | 10.4787 | 0.397637 | 99.99542 |
| Sample 10 | end | 10.81049 | 0.615746 | 99.99670 |
| Sample 11 | mid | 10.81744 | 0.480707 | 99.99392 |
| Sample 12 | beg | 10.79895 | 0.482676 | 99.98751 |
| Sample 13 | end | 10.44017 | 0.614959 | 99.99882 |
| Sample 14 | mid | 10.80186 | 0.511022 | 99.99317 |
| Sample 15 | beg | 10.78746 | 0.471258 | 99.99140 |
| Sample 16 | mid | 10.76691 | 0.485825 | 99.99791 |
| Sample 17 | beg | 10.81413 | 0.497636 | 99.99139 |
| Sample 18 | end | 10.50653 | 0.622046 | 99.99888 |
| Sample 19 | mid | 10.57619 | 0.517479 | 99.99620 |
| Sample 20 | beg | 10.49662 | 0.492912 | 99.99418 |
| Sample 21 | mid | 10.53832 | 0.492912 | 99.99895 |
| Sample 22 | beg | 10.50805 | 0.459447 | 99.99115 |
| Sample 23 | end | 10.80771 | 0.675982 | 99.99823 |
| Sample 24 | mid | 10.82069 | 0.533463 | 99.99613 |
| Sample 25 | beg | 10.80755 | 0.516534 | 99.98855 |

Next tests were performed on samples of completed filters made as described above. The percentage efficiency of this material is set forth in the following table:

| Finished Filter Testing | | |
|---|---|---|
| Filter Number | % Efficiency | Delta P in. H2O |
| 1 | 99.99999965 | 0.76 |
| 2 | 99.99999968 | 0.75 |
| 3 | 99.99999967 | 0.72 |
| 4 | 99.99981857 | 0.71 |
| 5 | 99.99999966 | 0.69 |
| 6 | 99.99992278 | 0.7 |
| 7 | 99.99998633 | 0.61 |
| 8 | 99.99999968 | 0.6 |
| 9 | 99.9999962 | 0.73 |
| 10 | 99.99987432 | 0.76 |
| 11 | 99.99999527 | 0.76 |
| 12 | 99.99962309 | 0.75 |
| 13 | 99.99999965 | 0.62 |
| 14 | 99.99990055 | 0.61 |
| 15 | 99.99999961 | 0.72 |
| 17 | 99.99999966 | 0.79 |
| 18 | 99.99999873 | 0.75 |
| 19 | 99.9999997 | 0.75 |

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A filter for use in air conditioning systems in clean facilities which comprises:

a primary filtration layer of microporous polytetrafluoroethylene (PTFE);

at least one upstream layer of permeable support material;

at least one down stream layer of permeable support material, the filtration layer being loosely sandwiched between the upstream layer and downstream layer of support material;

wherein the primary filtration layer and the support materials combine to provide a filtration efficiency of at least 99.97% at 0.3 µm and less than 1 inch water pressure drop at 100 ft/min air velocity.

2. The filter of claim 1 that further comprises a second filtration layer of microporous PTFE mounted in series with the primary filtration layer so as to provide uniform filtration through the filter.

3. The filter of claim 1 wherein the upstream support material comprises a layer of screen; and the down stream support material comprises a layer of screen.

4. The filter of claim 3 wherein the upstream support material includes an additional layer of relatively soft, flexible support material.

5. The filter of claim 4 wherein a second filtration layer of microporous PTFE is mounted in series with the primary filtration layer so as to provide uniform filtration through the filter.

6. The filter of claim 3 wherein the primary filtration layer and the screens are pleated.

7. The filter of claim 6 wherein the pleated filtration layer and screens are mounted and sealed in a frame.

8. The filter of claim 7 wherein the pleated filtration layer and screens are sealed in the frame with a potting material resistant to out-gassing.

9. The filter of claim 8 wherein the potting material is selected from the group consisting of silicone, polyurethane, epoxy, plastic adhesives, and plastisol.

10. The filter of claim 1 wherein the filter has a filtration efficiency of at least 99.99% at 0.1 μm.

11. The filter of claim 1 wherein the filter has a filtration efficiency of at least 99.999% at 0.1 μm.

12. The filter of claim 10 wherein the filter has a filtration efficiency of at least 99.99999% at 0.1 μm.

13. The filter of claim 1 which further comprises a second filtration layer of microporous PTFE mounted against the primary filtration layer;

wherein the two filtration layers serve to protect one another from damage and avoid leakage through random holes in either one of the filtration layers.

14. A filter for use in clean facilities for filtering air of contaminates which comprises:

a first filtration layer of microporous material;

a second filtration layer of microporous material mounted parallel to the first filtration layer;

at least one layer of support material mounted upstream of the filtration layers;

at least one layer of support material mounted downstream of the filtration layers;

wherein the filtration layers and the support material layers are pleated; and wherein the filter has a filtration efficiency of at least 99.999% at 0.1 μm and less than 1 inch water pressure drop at 100 ft/min air velocity.

15. The filter of claim 14 wherein an additional layer of support material is mounted upstream of the filtration layers.

16. The filter of claim 14 wherein the pleated filtration layers and support material are mounted in a frame with an air tight connection between the frame and the pleated filtration layers and support material.

17. The filter of claim 16 wherein the air tight connection comprises a potting material selected from the group comprising: silicone, hot-melt adhesive, polyurethane, epoxy, or plastisol.

18. The filter of claim 14 wherein each of the filter layers comprises microporous expanded polytetrafluoroethylene (PTFE) comprising a filtration efficiency of at least 99.99% at 0.1 μm at an airflow velocity of 10.5 ft/min.

19. The filter of claim 18 wherein each of the filter layers comprises material having a pressure drop of less than 0.5 inches of water at an airflow velocity of 12 ft/min.

20. The filter of claim 18 wherein each of the filter layers comprises a material with a mean ball burst value of at least 3.0 lb-force within a range of less than 1.4 between maximum and minimum values.

* * * * *